United States Patent Office 3,128,536
Patented Apr. 14, 1964

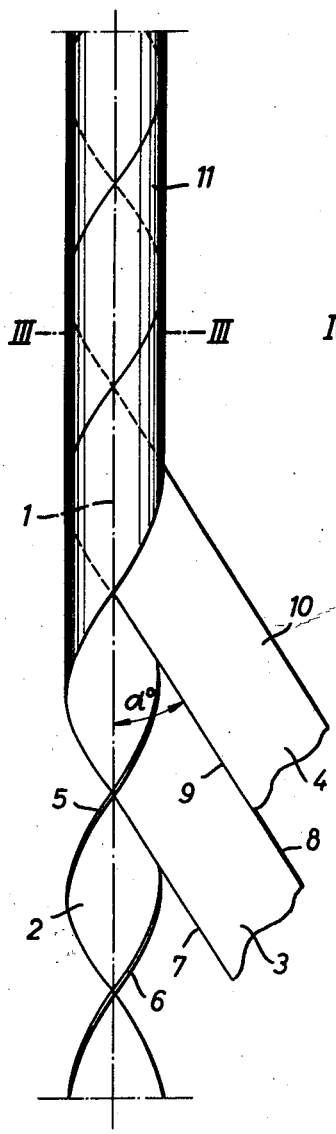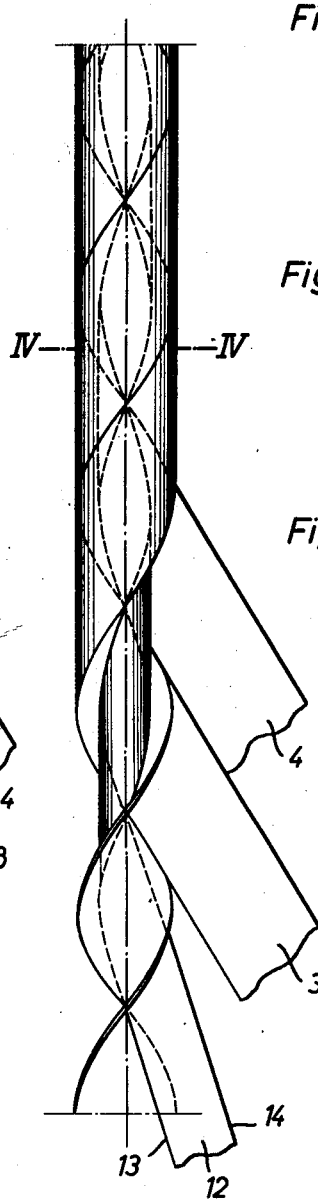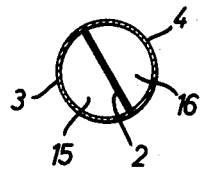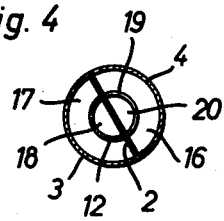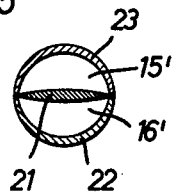

3,128,536
METHOD FOR PRODUCING HOLLOW BODIES FROM STRIPS
Wilhelm Eckhardt, Paris, France, assignor to Firma Driam S.A., Vaduz, Liechtenstein
Filed Apr. 10, 1961, Ser. No. 101,751
Claims priority, application Germany Jan. 19, 1961
7 Claims. (Cl. 29—155)

The present invention relates to a method for manufacturing a hollow body such as a boiler, pipe, tubular member or the like from at least two strips, connected with each other, preferably welded together, especially from steel strips, which are pressed against a concavely curved surface, are wound of spiral-seam-shape and are welded to one another.

Hollow bodies of this type are known in the prior art. If the hollow body of the prior art constructions consists of two strips wound with a seam of spiral shape, then one of the strips either partially or completely covers the other, i.e., both strips are fed in the same direction to a forming die or tool provided with a concavely curved surface, and after both strips have been deformed, are connected along the edge portions of the strips in contact with each other, preferably are welded together along these edge portions. Consequently, a type of double-walled hollow body is obtained with these prior art constructions whereby, however, no air-space is present between the two walls. Such hollow bodies were made in the prior art in order to obtain hollow bodies, subjected to high loads and stresses, which find application preferably in boiler constructions.

The present invention is basically concerned with the purpose and aim to make available a method for the manufacture of a hollow body from strips which, with a given weight, has a maximum resistance moment or section modulus, and more particular as regards bending, internal and/or external pressures as well as compression and tension in the longitudinal direction thereof and with respect to torsion.

Such hollow bodies, especially pipes in accordance with the present invention, are intended to be used as structural elements in structural installations and constructions in all of those places where maximum resistance moment or section modulus is of particular importance, completely aside from the fact that such pipes may also be used for conducting liquids, fluids, or the like. If structural installations and constructions are mentioned hereinabove, it is understood that such terminology does not relate only to stationary ones but also encompasses, within the spirit of the present invention, movable ones such as may find use in airplanes, motor vehicles, etc. Such hollow bodies, especially pipes, however, may also be used in connection with oil drilling installations as drill supports or the like. Of course, the hollow bodies in accordance with the present invention may also find use for other purposes, for example, as heat exchangers.

It is proposed as solution for the underlying problems of the present invention to twist one strip about the center longitudinal axis in the manner of a spiral worm-conveyor and to wind the other strip or strips with the seam thereof of spiral shape, preferably with the same pitch, and surrounding the first strip tangentially in such a manner that the connecting means such as the welded seam of the second strip which has a larger width than the first strip, coincides with one surface of the narrow side of the first strip, and thereafter additionally to connect or weld the second surface of the small side of the first strip with the second strip surrounding the first strip, or in case of use of three strips, to connect the seams of the second and third strip with one surface each of the small side of the first strip.

It is preferable in accordance with the present invention to initially twist a part of the first strip in the manner of a spiral worm-conveyor and to weld to one or both of the two deformed surfaces of the small sides thereof the second or the second and third strip, and to carry out, during further twisting of the inner strip, the further welding operations. However, it is also possible to connect one or several strips, preferably by welding, with the inner strip twisted in the manner of a worm-conveyor, prior to welding of the strip or strips forming the outer layer or cover for the spirally twisted pipe, which cover only portions of the spiral surfaces of the inner strip, i.e., do not surround the strip that is twisted in the manner of a spiral conveyor worm. Of course, the strip twisted in the manner of a worm conveyor may also be connected with two strips, preferably by welding, which do not surround the first strip so that a type of worm conveyor is formed providing effectively two hollow spaces, closed off with respect to each other, within the area of the axis thereof.

Accordingly, it is an object of the present invention to provide hollow bodies of the type described hereinabove which avoid the disadvantages and inadequacies of the prior art methods and constructions resulting therefrom.

It is another object of the present invention to provide a method for manufacturing a hollow body from individual strips of steel or other suitable material which offers optimum characteristics as regards the ability to withstand forces and pressures in the axial, radial as well as rotational directions.

Still another object of the present invention resides in the provision of a method for producing hollow bodies which is simple, permits the attainment of a plurality of hollow spaces completely separated from one another within the hollow member and which assures good life-length of the finished product.

These and other objects, features and advantages of the present invention will become more obvious from the following description when taken in connection with the accompanying drawing which shows, for purposes of illustration only, several embodiments in accordance with the present invention, and wherein FIGURE 1 is a plan view of a hollow body such as a pipe consisting of three wound strips and made in accordance with the present invention.

FIGURE 2 is a plan view, similar to FIGURE 1 of a modified embodiment of a hollow body made of three strips in accordance with the present invention, FIGURE 3 is a cross sectional view taken along line III—III of FIGURE 1, FIGURE 4 is a cross sectional view taken along line IV—IV of FIGURE 2, and FIGURE 5 is a cross sectional view of a hollow tubular member made of three strips, similar to FIGURE 1, in accordance with the present invention, whereby each strip has a cross section different from the usual rectangular cross section thereof.

Referring now to the drawing wherein like reference numerals are used throughout the various views to designate corresponding parts, and more particularly to FIGURE 1, the pipe illustrated therein essentially consists of a strip 2 twisted about the center longitudinal axis 1 thereof in a worm-conveyor-like manner and of two strips 3 and 4 constituting the outer cover which are wound parallel alongside one another about the strip 2 twisted in a worm-conveyor-like manner in such a manner that the longitudinal edges 5 and 6 of the strip 2 are adapted to be connected with the longitudianl edges 7 and 8 of the strip 3 and the longitudinal edges 9 and 10 of the strip 8, preferably by welding. Consequently, according to the present invention, the strip 2 is initially twisted in a worm-conveyor-like manner which may be realized in any suitable manner and by any known conventional means, is thereupon fed to a forming die or forming tool of any suitable conventional constructions (not illustrated herein), and thereafter the strips 3 and 4 are fed to the shaping tool for forming die at an angle in such a manner that the strips surround the spirally-twisted strip 2. It is appropriate, as is known, to weld the strips 3 and 4 to the strip 2 in those places where they come into contact with each other for the first time. There is formed a pipe 11 by the use of the method described hereinabove which has an external appearance, exactly identical to the wound pipes having spiral seams of the prior art, which, however, is provided internally with a spiral worm that forms within the outer cover or jacket of the pipe two spaces completely separated from one another.

A pipe made in accordance with the present invention possesses a significantly greater resistance moment or section modulus than the wound pipes of known construction and having spiral seams which form only a single hollow space. If a pipe in accordance with the present invention is used, for example, as carrier of a drill cutter head, then the pipe 2 twisted in a worm-conveyor-like manner may be utilized as means for raising the material into which the drill cutter head is lowered during the boring operation.

If it is desirable to have available within the pipe more than two hollow spaces, then a further strip 12 may be arranged, as shown in FIGURE 2, within the space enclosed by strips 3 and 4. The longitudinal edges 13 and 14 of strip 12 are in contact with a helical surface and are connected therewith preferably by welding. Of course, in place of only a single additional strip 12, several additional strips may be provided in order to form additional hollow spaces, if so desired.

As may be readily seen from the cross sectional view of FIGURE 3, the strips 2, 3 and 4 form two hollow spaces 15 and 16, respectively.

It may also be readily seen from the cross sectional view of FIGURE 4 that the strips 2, 3, 4 and 12 form three hollow spaces, 16, 17 and 18, respectively. If an additional strip 19 is coordinated to the other helical surface of the strip 2, then an additional space 20 may be formed, as indicated in FIGURE 4 in dash lines, whereby it is not necessary to make certain that strips 12 and 19 have the same width.

Whereas wound pipes having helically-shaped seams are manufactured, as a rule, of strips having rectangular cross section, it is particularly appropriate in accordance with the present invention to select a cross section different from the rectangular cross section, as may be readily seen from FIGURE 5. Each of the strips 21, 22 and 23 is thicker within the center region thereof than within the region corresponding to the longitudinal edges thereof. In the embodiment of FIGURE 5, two hollow spaces 15' and 16' are again formed by the use of three strips 21, 22 and 23. Of course, any other suitable non-uniform cross section may also be used in connection with the strips.

In the place of the two strips 3 and 4, it is also possible in accordance with the present invention to select a single strip of corresponding width so that a hollow body will result made of only two strips. The two strips 3 and 4 are thereby replaced by a single strip of corresponding width. In that case, however, it is necessary to weld a longitudinal edge of the spirally twisted strip 2 with this wide outer strip along the center line of this outer strip which replaces the two strips 3 and 4 of FIGURES 1 and 2.

If one or several further strips are arranged within the outer cover or casing of a hollow body, then it is recommended in accordance with the present invention to utilize another material for the internal strips than that used for the external strips. For example, if two strips 12 and 19 enclose one hollow space each, then it may also be appropriate to make, not only the strips 12 and 19 but also strip 2 of corrosion resistant material, for example, of rustproof steel. Depending on the strength of the individual materials, the cross sections of the different strips have to be dimensioned correspondingly. Accordingly, the inner walls may have a relatively slight wall thickness, for example, may be constructed in the manner of membranes.

Of course, it is also feasible to coordinate to the spirally-twisted strip 2 only two strips 12 and 19 which appropriately have the same width so that a type of worm-conveyor is formed, whereby two hollow spaces separated from one another are formed within the axial region thereof. These hollow spaces, on the one hand, serve the purpose of reinforcement of the worm, however, they may also be used for cooling or heating purposes, depending on the intended use of such a pipe.

While I have shown and described several embodiments in accordance with the present invention, it is understood that the same is not limited thereto but is susceptible of many changes and modifications within the spirit and scope of the present invention and I, therefore, do not wish to be limited to the details shown and described herein but intend to cover all such changes and modifications as are encompassed by the scope of the appended claims.

I claim:

1. A method of producing reinforced rigid tubular bodies comprising the steps of, spirally twisting a flat strip about its longitudinal axis to form a spiral web, feeding and bending in edge to edge relation two other strips obliquely to said longitudinal axis and about said spiral web to form the tubular covering therefor, the longitudinal axis of the tubular body corresponding to said longitudinal axis of said web, said two other strips forming spiral seams adjacent to and of a pitch equal to the side edges of said web, and bonding said two strips and said side edges of said web to each other at said seams to form a rigid webbed tubular body.

2. A method according to claim 1 wherein said bonding comprises welding.

3. A method of producing reinforced rigid tubular bodies comprising the steps of spirally twisting a flat strip about its longitudinal axis to form a spiral web, simultaneously feeding and bending in edge to edge relation two other strips obliquely to said longitudinal axis and about the spirally twisted flat strip to envelop said web and to form a tubular covering therefor having two spiral seams, bonding said two other strips in edge to edge relationship to each other at said spiral seams, and bonding said web to said covering.

4. A method according to claim 3 wherein said seams and the side edges of said web have the same pitch, and wherein said seams overlie said side edges.

5. A method of producing a reinforced rigid tubular body comprising the steps of, spirally twisting a flat strip about its longitudinal axis to form a spiral web, feeding and bending in edge to edge relation a plurality of other strips obliquely to said longitudinal axis and about the spirally twisted flat strip to form a tubular covering therefor, then bonding said plurality of strips at their side edges to each other and bonding both side edges of said spiral web to said covering.

6. A method of producing reinforced rigid tubular bodies comprising the steps of, forming a spiral web by first partially spirally twisting a first strip around its longitudinal axis, bending and bonding a second strip to one of the side edges of the partially twisted first strip, further twisting said spiral web and wrapping a third strip around said web and bringing the sides of said third strip into a spiral seam forming relationship with said second strip, and bonding said second and third strips at the seams to form a rigid webbed tubular structure.

7. A method according to claim 6 wherein said third strip is bonded to the other of said side edges of said partially spirally twisted first strip, and wherein upon further twisting of said first strip the edges of said second and third strips are brought into said seam forming relationship.

References Cited in the file of this patent

UNITED STATES PATENTS

| | | |
|---|---|---|
| 1,009,732 | Fisher | Nov. 28, 1911 |
| 1,013,489 | Haskell | Jan. 2, 1912 |
| 1,545,456 | Rastetter | July 7, 1925 |
| 1,617,262 | Malone | Feb. 8, 1927 |
| 1,942,445 | Oldham | Jan. 9, 1934 |
| 1,998,367 | Hammell | Apr. 16, 1935 |
| 2,072,284 | Voorhees | Mar. 2, 1937 |
| 2,081,691 | Zapf | May 25, 1937 |
| 2,411,874 | Golden | Dec. 3, 1946 |